United States Patent
Ito (10) Patent No.: US 11,949,809 B2
(45) Date of Patent: Apr. 2, 2024

(54) OPTIMIZATION APPARATUS, OPTIMIZATION METHOD, AND NON-TRANSITORY COMPUTER-READABLE MEDIUM IN WHICH OPTIMIZATION PROGRAM IS STORED

(71) Applicant: NEC Corporation, Tokyo (JP)

(72) Inventor: Shinji Ito, Tokyo (JP)

(73) Assignee: NEC CORPORATION, Tokyo (JP)

( * ) Notice: Subject to any disclaimer, the term of this patent is extended or adjusted under 35 U.S.C. 154(b) by 58 days.

(21) Appl. No.: 17/765,139

(22) PCT Filed: Oct. 7, 2019

(86) PCT No.: PCT/JP2019/039519
§ 371 (c)(1),
(2) Date: Mar. 30, 2022

(87) PCT Pub. No.: WO2021/070229
PCT Pub. Date: Apr. 15, 2021

(65) Prior Publication Data
US 2023/0009019 A1    Jan. 12, 2023

(51) Int. Cl.
*H04M 15/00*    (2006.01)
*H04L 41/0823*    (2022.01)
*H04W 24/02*    (2009.01)

(52) U.S. Cl.
CPC ........ *H04M 15/66* (2013.01); *H04L 41/0823* (2013.01); *H04W 24/02* (2013.01)

(58) Field of Classification Search
CPC .... H04M 15/66; H04L 41/0823; H04W 24/02
See application file for complete search history.

(56) References Cited

U.S. PATENT DOCUMENTS

| 11,669,768 B2* | 6/2023 | Theocharous | G06N 5/04 |
| | | | 706/12 |
| 2005/0256778 A1* | 11/2005 | Boyd | G06Q 30/0244 |
| | | | 705/14.43 |

(Continued)

FOREIGN PATENT DOCUMENTS

| JP | 2012-141683 A | 7/2012 |
| JP | 2016-122241 A | 7/2016 |
| JP | 2020-009283 A | 1/2020 |

OTHER PUBLICATIONS

Reverdy et al., Parameter Estimation in Softmax Decision-Making Models with Linear Objective Functions, Jan. 2016, IEEE vol. 13 (Year: 2016).*

(Continued)

*Primary Examiner* — John A Follansbee
*Assistant Examiner* — Fadi Haj Said (57) ABSTRACT

An optimization apparatus (100) includes a setting unit (110) that sets a predetermined non-linear objective function, a policy determination unit (120) that determines a policy to be executed in online optimization in a bandit problem, based on the non-linear objective function, a policy execution unit (130) that acquires a reward as an execution result of the determined policy, an update rate determination unit (140) that determines an update rate of the non-linear objective function by a multiplicative weight update method, based on the acquired reward and the non-linear objective function, and an update unit (150) that updates the non-linear objective function, based on the update rate.

7 Claims, 4 Drawing Sheets

(56) References Cited

U.S. PATENT DOCUMENTS

| | | | |
|---|---|---|---|
| 2015/0081393 A1* | 3/2015 | Cohen | G06Q 30/0206 705/7.35 |
| 2018/0220061 A1* | 8/2018 | Wang | G06N 3/02 |
| 2018/0307986 A1* | 10/2018 | Kabul | G06F 9/46 |

OTHER PUBLICATIONS

JP Office Action for JP Application No. 2021-550960, dated May 2, 2023 with English Translation.

International Search Report for PCT Application No. PCT/JP2019/039519, dated Dec. 10, 2019.

A.D. Flaxman et al., "Online convex optimization in the bandit setting: gradient descent without a gradient", Nov. 30, 2004, <URL: http://www.cs.cmu.edu/~mcmahan/soda2005.pdf>, pp. 1-10.

A.Schrijver, "Theory of linear and integer programming", John Wiley & Sons, 1998, pp. 1-484.

E. Hazan and K. Levy, "Bandit convex optimization: Towards tight bounds", In Advances in Neural Information Processing Systems, pp. 784-792, 2014.

L. Lovasz and S. Vempala, "The geometry of logconcave functions and sampling algorithms", Mar. 2005, <URL: https://www.cc.gatech.edu/~vempala/papers/logcon.pdf>, pp. 1-56.

A. Saumard and J. A. Weilner, "Log-concavity and strong log-concavity: a review, Statistics surveys", 8:45, 2014, pp. 1-67.

S. Arora, E. Hazan, and S. Kale, "The multiplicative weights update method: a meta algorithm and applications", Theory of Computing, 8(1):121-164, 2012, pp. 1-31.

A.Belloni, T. Liang, H. Narayanan, and A. Rakhlin, "Escaping the local minima via simulated annealing: Optimization of approximately convex functions", In Conference on Learning Theory, pp. 240-265, 2015.

Kale, Satyen et al., "Non-Stochastic Bandit Slate Problems", Neural Information Processing Systems Foundation, Inc., 2010, pp. 1-11.

\* cited by examiner

OPTIMIZATION APPARATUS, OPTIMIZATION METHOD, AND NON-TRANSITORY COMPUTER-READABLE MEDIUM IN WHICH OPTIMIZATION PROGRAM IS STORED

This application is a National Stage Entry of PCT/JP2019/039519 filed on Oct. 7, 2019, the contents of all of which are incorporated herein by reference, in their entirety.

TECHNICAL FIELD

The present invention relates to an optimization apparatus, an optimization method, and an optimization program, and more particularly, to an optimization apparatus, an optimization method, and an optimization program that perform online optimization in a bandit problem.

BACKGROUND ART

Online optimization techniques are known in a field of decision making, such as policy determination in a marketing field. In the online optimization, an optimal policy is determined based on setting that a value of an objective function is acquired each time a certain policy is executed. Moreover, in reality, there is a case in which values of the objective function are acquired only partially in the online optimization (a bandit problem). Specifically, when a certain policy A is executed, a value of an objective function associated to the policy A (e.g., a reward acquired by executing the policy A) can be acquired. However, a value of the objective function to be acquired when executing a policy B is unknown. Therefore, there has been a technique of online optimization in a case where values of the objective function can be acquired only partially in a linear function. Furthermore, Non Patent Literature 1 discloses a technique related to online optimization of a policy for a non-linear function.

Non Patent Literature 2 discloses a theory of linear and integer programming. Non Patent Literature 3 discloses a technique related to bandit convex optimization. Non Patent Literature 4 discloses a technique related to the geometry of logarithmic concave functions and sampling algorithms. Non Patent Literature 5 discloses a statistical study on logarithmic concavities and strong logarithmic concavities. Non Patent Literature 6 discloses a technique related to a multiplicative weights update method. Non Patent Literature 7 discloses a technique related to optimization of an approximately convex function.

CITATION LIST

Non Patent Literature

[Non Patent Literature 1] A. D. Flaxman, A. T. Kalai, and H. B. McMahan, "Online convex optimization in the bandit setting: gradient descent without a gradient" [online], 30 Nov. 2004, [Search on Oct. 2, 2019], Internet <URL: http://www.cs.cmu.edu/-mcmahan/soda2005.pdf>
[Non Patent Literature 2] A. Schrijver, Theory of linear and integer programming, John Wiley & Sons, 1998.
[Non Patent Literature 3] E. Hazan and K. Levy, Bandit convex optimization: Towards tight bounds, In Advances in Neural Information Processing Systems, pages 784-792, 2014.
[Non Patent Literature 4] L. Lovasz and S. Vempala, The geometry of logconcave functions and sampling algorithms, [online], March 2005, [Search on Oct. 2, 2019], Internet <URL: https://www.cc.gatech.edu/-vempala/papers/logcon.pdf>
[Non Patent Literature 5] A. Saumard and J. A. Wellner, Log-concavity and strong log-concavity: a review, Statistics surveys, 8:45, 2014.
[Non Patent Literature 6] S. Arora, E. Hazan, and S. Kale, The multiplicative weights update method: a meta-algorithm and applications, Theory of Computing, 8(1):121-164, 2012.
[Non Patent Literature 7] A. Belloni, T. Liang, H. Narayanan, and A. Rakhlin, Escaping the local minima via simulated annealing: Optimization of approximately convex functions, In Conference on Learning Theory, pages 240-265, 2015.

SUMMARY OF INVENTION

Technical Problem

However, the technique according to Non Patent Literature 1 has insufficient precision in online optimization in a case where values of an objective function are only partially acquired for the non-linear objective function.

The present disclosure has been made in order to solve such a problem, and an object thereof is to provide an optimization apparatus, an optimization method, and an optimization program for achieving high-precision optimization in online optimization in a case where values of an objective function are only partially acquired for a non-linear objective function.

Solution to Problem

An optimization apparatus according to a first aspect of the present disclosure includes:
 a setting unit that sets a predetermined non-linear objective function;
 a policy determination unit that determines a policy to be executed in online optimization in a bandit problem, based on the non-linear objective function;
 a policy execution unit that acquires a reward as an execution result of the determined policy;
 an update rate determination unit that determines an update rate of the non-linear objective function by a multiplicative weight update method, based on the acquired reward and the non-linear objective function; and
 an update unit that updates the non-linear objective function, based on the update rate.

An optimization method according to a second aspect of the present disclosure includes,
 by a computer:
 setting a predetermined non-linear objective function;
 determining a policy to be executed in online optimization in a bandit problem, based on the non-linear objective function;
 acquiring a reward as an execution result of the determined policy;
 determining an update rate of the non-linear objective function by a multiplicative weight update method, based on the acquired reward and the non-linear objective function; and
 updating the non-linear objective function, based on the update rate.

An optimization program according to a third aspect of the present disclosure causes a computer to execute:

setting processing of setting a predetermined non-linear objective function;

policy determination processing of determining a policy to be executed in online optimization in a bandit problem, based on the non-linear objective function;

policy execution processing of acquiring a reward as an execution result of the determined policy;

update rate determination processing of determining an update rate of the non-linear objective function by a multiplicative weight update method, based on the acquired reward and the non-linear objective function; and update processing of updating the non-linear objective function, based on the update rate.

Advantageous Effects of Invention

According to the present invention, it is possible to provide an optimization apparatus, an optimization method, and an optimization program for achieving high-precision optimization in online optimization in a case where values of an objective function are only partially acquired for a non-linear objective function.

DESCRIPTION OF EMBODIMENTS

Hereinafter, example embodiments of the present disclosure will be described in detail with reference to the drawings. In the drawings, the same or associated elements are denoted by the same reference numerals, and duplicate descriptions are omitted as necessary for clarity of description.

First Example Embodiment

Figure 1:
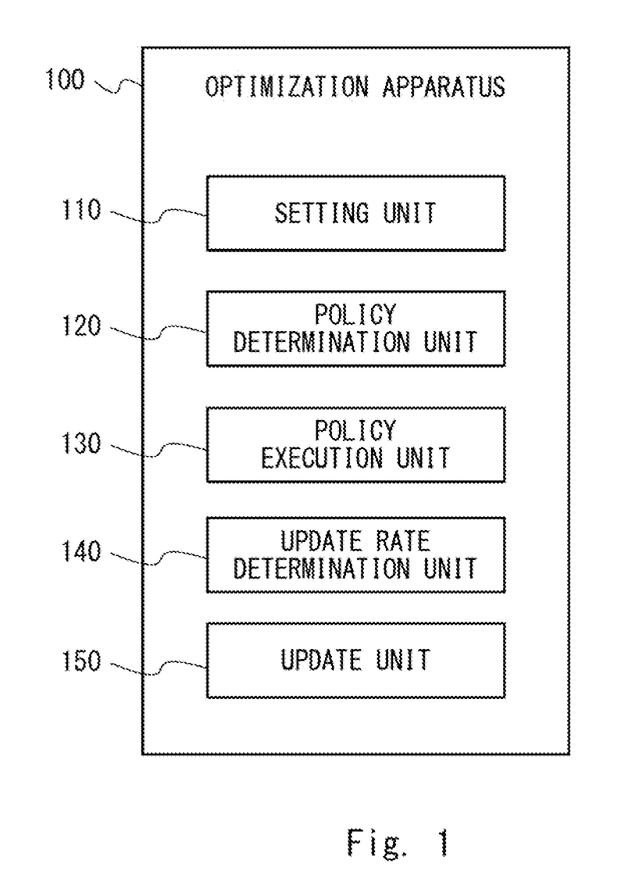
FIG. 1 is a block diagram illustrating a configuration of an optimization apparatus according to a first example embodiment.

FIG. 1 is a block diagram illustrating a configuration of an optimization apparatus 100 according to the first example embodiment. The optimization apparatus 100 is an information processing apparatus that performs online optimization in a bandit problem. Herein, the bandit problem is a problem in which a case where a content of an objective function changes every time a solution (policy) is executed by using the objective function, and only a value (reward) of an objective function in a selected solution can be observed is set. Thus, online optimization in the bandit problem is online optimization when values of the objective function are only partially acquired.

The optimization apparatus 100 includes a setting unit 110, a policy determination unit 120, a policy execution unit 130, an update rate determination unit 140, and an update unit 150. The setting unit 110 sets a predetermined non-linear objective function. The policy determination unit 120 determines a policy to be executed in the online optimization in the bandit problem, based on the non-linear objective function. The policy execution unit 130 acquires a reward as an execution result of the determined policy. The update rate determination unit 140 determines an update rate of a non-linear objective function by a multiplicative weight update method, based on the acquired reward and the non-linear objective function. Herein, the multiplicative weight update method is, for example, a method disclosed in Non Patent Literature 6. The update unit 150 updates the non-linear objective function, based on the update rate.

Figure 2:
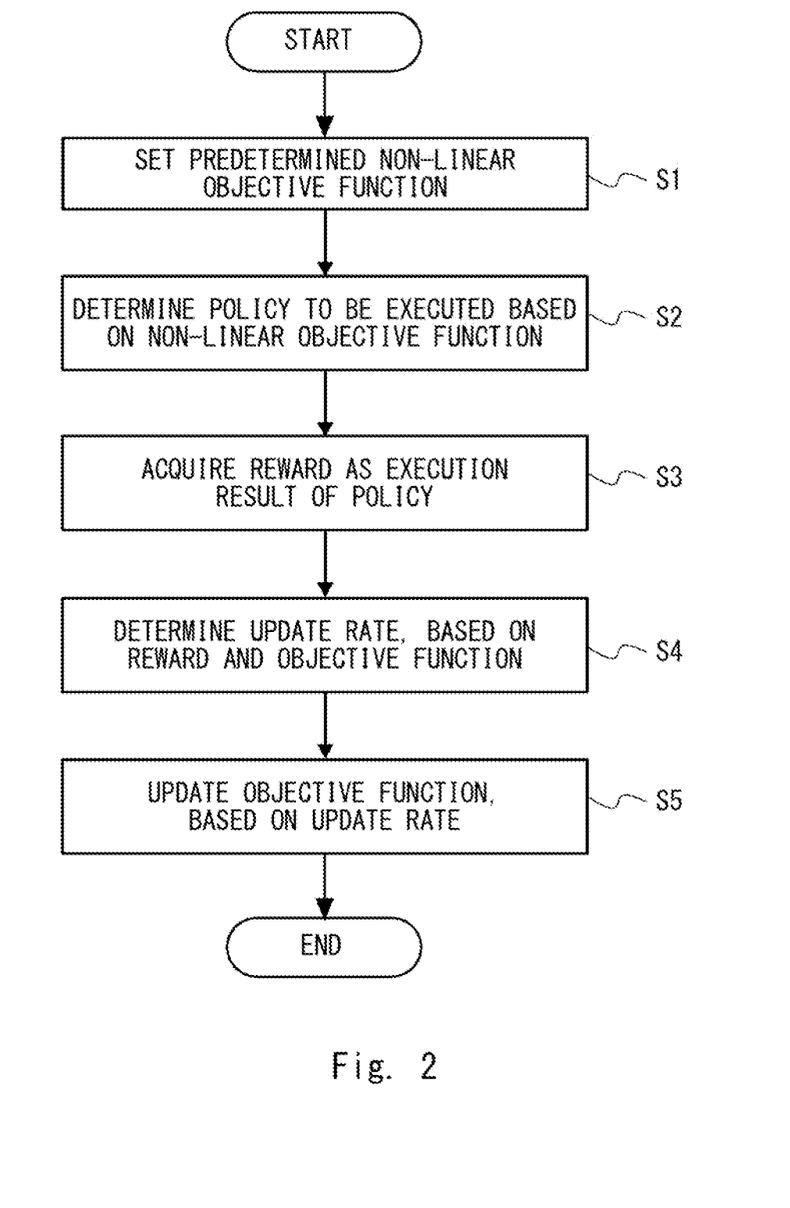
FIG. 2 is a flowchart illustrating a flow of an optimization method according to the first example embodiment.

FIG. 2 is a flowchart illustrating a flow of the optimization method according to the first example embodiment. First, the setting unit 110 sets a predetermined non-linear objective function (S1). Next, the policy determination unit 120 determines a policy to be executed in the online optimization in the bandit problem, based on the non-linear objective function (S2). Then, the policy execution unit 130 acquires a reward as an execution result of the determined policy (S3). Subsequently, the update rate determination unit 140 determines an update rate of the non-linear objective function by the multiplicative weight update method, based on the acquired reward and the non-linear objective function (S4). Thereafter, the update unit 150 updates the non-linear objective function, based on the update rate (S5).

As described above, in the present example embodiment, in the online optimization in a case where values of the objective function are only partially acquired for the non-linear objective function, the update rate by the multiplicative weight update method is determined from the determined policy, and the non-linear objective function is updated by the update rate. Therefore, high-precision optimization can be achieved.

The optimization apparatus 100 includes a processor, a memory, and a storage device as a configuration not illustrated. The storage device stores a computer program in which processing of the optimization method according to the present example embodiment is implemented. The processor then causes a computer program to be read from the storage device into the memory and executes the computer program. As a result, the processor achieves functions of the setting unit 110, the policy determination unit 120, the policy execution unit 130, the update rate determination unit 140, and the update unit 150.

Alternatively, each of the setting unit 110, the policy determination unit 120, the policy execution unit 130, the update rate determination unit 140, and the update unit 150 may be achieved by dedicated hardware. In addition, a part or all of each component of each apparatus may be achieved by a general-purpose or special-purpose circuitry, a processor, or the like, or a combination thereof. These may be configured by a single chip, or may be configured by a plurality of chips connected via a bus. A part or all of each component of each apparatus may be achieved by a combination of the above-described circuitry or the like with a program. As the processor, a central processing unit (CPU), a graphics processing unit (GPU), a field-programmable gate array (FPGA), or the like can be used.

When a part or all of the components of the optimization apparatus 100 are achieved by a plurality of information processing apparatuses, circuitries, and the like, the plurality of information processing apparatuses, circuitries, and the like may be concentratedly arranged or dispersedly arranged. For example, the information processing apparatus, the circuitry, and the like may be achieved as a client-server system, a cloud computing system, and the like, each of which is connected via a communication network. Functions of the optimization apparatus 100 may be provided in a software as a service (SaaS) format.

Second Example Embodiment

Bandit convex optimization (BCO) is an online decision-making framework with limited (partial) feedback. In this framework, a player is given a convex feasible region K satisfying $K \subseteq R^d$ and the number of repetition times T of decision making. Herein, d is a positive number indicating the number of dimensions of the feasible region. For each of the numbers of repetition times $t=1, 2, \ldots T$, the player selects an action (policy) $a_t \in K$ and at the same time, the circumstance selects a convex function $f_t$. The player observes feedback of the $f_t(a_t)$ prior to selecting the following policy $a_t+1$. Herein, it is assumed that K is a positive amount, i.e., $$\int_{x \in K} Idx > 0. \qquad \text{[Math. 1]}$$

It is assumed that $f_t$ is σ-strongly convex and β-smooth. In other words, the following expressions (1) and (2) are satisfied for all x and $y \in K$:

[Math. 2]
$$f_t(y) \geq f_t(x) + \nabla f_t(x)^T(y-x) + \frac{\sigma}{2}\|y-x\|_2^2, \qquad (1)$$

[Math. 3]
$$f_t(y) \leq f_t(x) + \nabla f_t(x)^T(y-x) + \frac{\beta}{2}\|y-x\|_2^2. \qquad (2)$$

Performance of the player is evaluated with respect to Regret $R_T(x^*)$, which is an evaluation index. Herein, Regret $R_T(x^*)$ is defined by the following equation (3) with respect to $x^* \in K$:

[Math. 4]
$$R_T(x^*) = \sum_{t=1}^T f_t(a_t) - \sum_{t=1}^T f_t(x^*). \qquad (3)$$

In the present disclosure, as for a player capability, a convex benchmark set $K' \subseteq K$ is selected (employed). Herein, the Regret $R_T(x^*)$ for $x^* \in K'$ is considered. In other words, A value of $$sup_{x^* \in K} E[R_T(x^*)] \qquad \text{[Math. 5]}$$

and a gap to be expected between a cumulative loss on outputs of algorithms and an optimal independent policy $x^*$ belonging to K' are noted. Note that E[ ] is an expected value. When the optimal independent policy $x^*$ that satisfies the following belongs to K', a value of $$x^* \in \arg\min_{x \in K} \sum_{t=1}^T f_t(x) \qquad \text{[Math. 6]}$$

$$sup_{x^* \in K'} E[R_T(x^*)] \qquad \text{[Math. 7]}$$

is equal to a standard worst-case Regret, $$sup_{x^* \in K} E[R_T(x^*)] \qquad \text{[Math. 8]}$$

When $\|y-x\|_2 \leq \gamma$ implies $y \in K$, $x \in R^d$ is γ-interiors of K. For example, when K is expressed by an m-linear inequality, i.e., K is expressed as $$K = \{x \in \mathbb{R}^d | a_j^T x \leq b_j \ (j \in [m])\}, \qquad \text{[Math. 9]}$$

the convex set K' defined by $$K' = \{x \in \mathbb{R}^d | a_j^T x \leq b_j - r \ (j \in [m])\} \qquad \text{[Math. 10]}$$

consists of r-interiors of K.

For a generic benchmark set $K' \subseteq K$, let $r \geq 0$ be a non-negative real value, where all members of K' are r-interiors. For a special case at K'=K, r is equal to zero. It is further assumed that there is a positive number R>0 where $l_2$ norm of any element of K' is at most R.

It also allows access to a membership oracle for K'. This means that $x \in R^d$ is given, and it can be determined whether $x \in K'$ by calling the membership oracle. When K' is expressed by an m inequality $$K' = \{x \in \mathbb{R}^d | g_j(x) \leq 0 \ (j \in [m])\}, \qquad \text{[Math. 11]}$$

there is an access to a membership oracle for K'. This is because by evaluating $g_i(x)$ for $i \in [m]$, it can be checked whether $x \in K$. Furthermore, when a linear optimization problem on K' in polynomial time can be solved, it is known from Non Patent Literature 2 to have a membership oracle of polynomial time for K'.

<Notation>

For a vector $x=(x_1, \ldots, x_d)^T \in R^d$, let the $l_2$ norm of x is assumed to be $\|x\|_2$. In other words, it is as follows.

$$\|x\|_2 = \sqrt{x^T x} = \sqrt{\sum_{i=1}^d x_i^2} \qquad \text{[Math. 12]}$$

Let $l_2$-operator norm be $\|X\|_2$ for a matrix $X \in R^{d \times d}$. In other words, $\|X\|_2 = \max\{\|Xy\|_2 | y \in R^d, \|y\|_2=1\}$. When X is a symmetric matrix, $\|X\|_2$ is equal to the largest absolute value of an eigenvalue of X. Given a positive half constant sign matrix $A \in R^{d \times d}$ and the vector $x \in R^d$, $\|x\|_A$ is defined as follows:

$$\|x\|_A = \sqrt{x^T A x} = \|A^{1/2} x\|_2. \qquad \text{[Math. 13]}$$

Similarly, for the matrix XERd, the following is assumed to be $\|X\|_A$:

$$\|X\|_A = \|A^{1/2} X A^{1/2}\|_2. \qquad \text{[Math. 14]}$$

<Smoothed Convex Function>

Let v and u be random variables that follow uniform distribution on each of $B^d = \{v \in R^d \ | \ \|v\|_2 \leq 1\}$ and $S^d = \{u \in R^d \ | \ \|u\|_2=1\}$. For a convex function f and a regular matrix $B \in R^{d \times d}$ on the $R^d$, a smoothing function $\hat{f}$ is defined by the following equation (4):

$$\hat{f}_B(x) = E[f(x+B_v)] \qquad \text{[Math. 15]} \ldots (4).$$

<Auxiliary Theorem 1 (Non Patent Literature 3)>

A gradient of $\hat{f}_B$ is expressed by the following equation (5):

$$\nabla \hat{f}_B(x) = E[d \cdot f(x+B_v) B^{-1} u] \qquad \text{[Math. 16]} \ldots (5).$$

When f is β-smooth, the following expression (6) is held:

[Math. 17]
$$0 \leq \hat{f}_B(x) - f(x) \leq \frac{\beta}{2}\|B^T B\|_2 = \frac{\beta}{2}\lambda_1(B^T B). \qquad (6)$$

When f is σ-strongly convex, $\hat{f}_B$ is also σ-strongly convex.

The equation (5) is illustrated by the Stokes' theorem, and the expression (6) is derived from the definition of β-smooth. In bandit feedback setting, even though an unbiased estimated value of a gradient of $f_t$ cannot be utilized, those for the smoothed $\hat{f}_t$ can be constructed based on the equation (5). A difference between $f_t$ and $\hat{f}_t$ may be bounded by the expression (6).

<Log-Concave Distribution>

A probability distribution on a convex set $K \subseteq R^d$ is called a log-concave distribution when its probability density function $p:K \to R$ is expressed as $p(x)=\exp(-g(x))$ by using a convex function $g:K \to R$, where a logarithm of $p(x)$ is a concave function. The algorithm of the present disclosure maintains a log-concave distribution. Random samples from log-concave distributions can be efficiently generated with mild assumptions. In fact, there is a computationally efficient MCMC algorithm for sampling from p in a study that is given a membership oracle for K and an evaluation oracle for g, as illustrated in Non Patent Literature 4. Thus, the present disclosure can efficiently compute an estimated value of a covariance matrix Cov(p) for a mean μ(p) and p. The following auxiliary theorems are useful when limiting variables of the log-concave distribution.

<Auxiliary Theorem 2 (Prop. 10.1 of Non Patent Literature 5)>

It is assumed that a logarithmic concave distribution on K has a probability density function $p(x)=\exp(-g(x))$. Herein, g is a σ-strongly convex function. At this time, a covariance matrix Σ of p satisfies $\|\Sigma\|_2 \leq 1/\sigma$.

In order to ensure that an output $a_t$ of the algorithm of the present disclosure is included in K, the following auxiliary theorem is used.

<Auxiliary Theorem 3 (Non Patent Literature 4)>

Let p be a logarithmic concave distribution on K. At this time, the following ellipsoid is included in K:

$$\{x \in \mathbb{R}^d \mid \|x-\mu(p)\|_{Cov(p)^{-1}} \leq 1/e\} \quad \text{[Math. 18]}$$

<Configuration of Optimization Apparatus>

Figure 3:
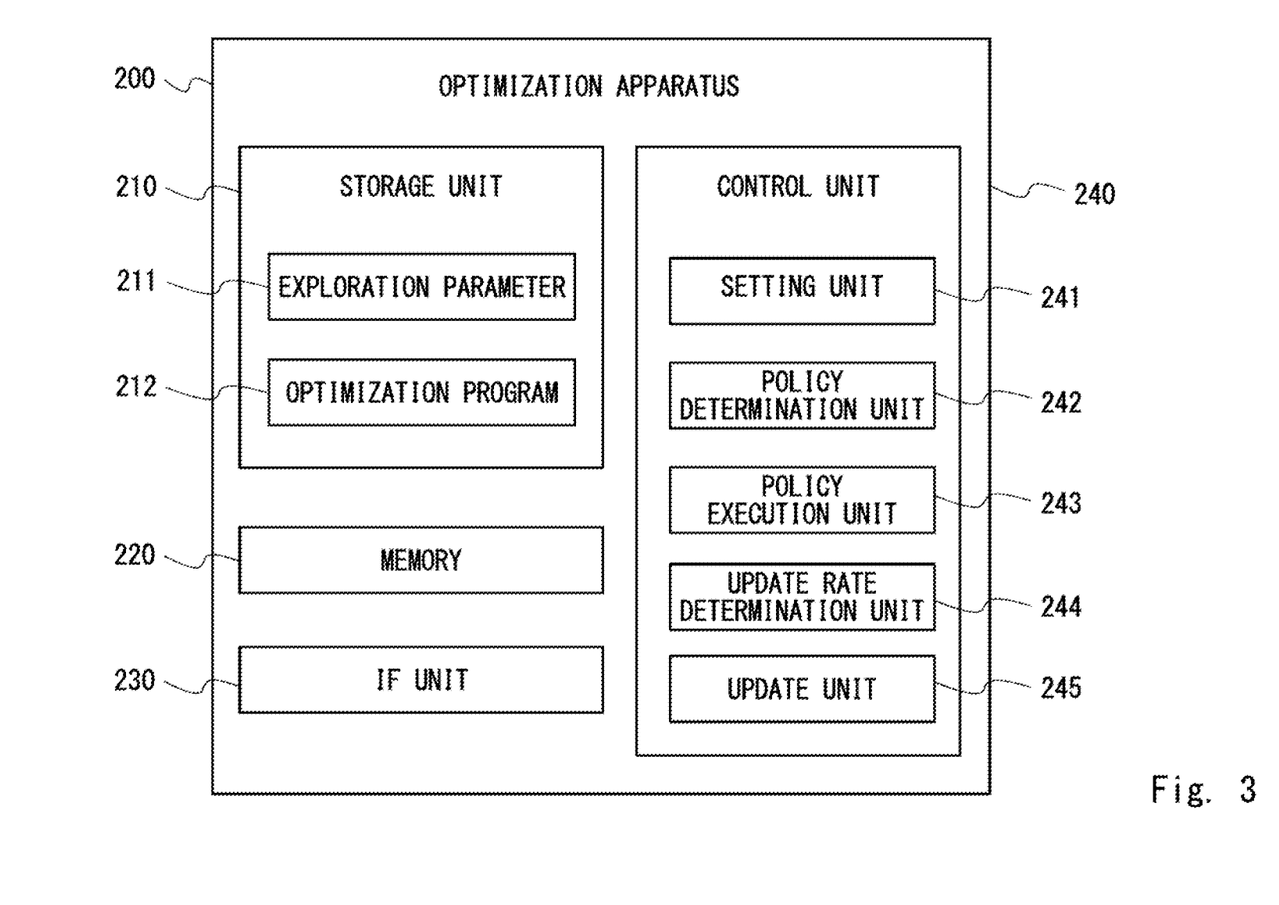
FIG. 3 is a block diagram illustrating a configuration of an optimization apparatus according to a second example embodiment.

FIG. 3 is a block diagram illustrating a configuration of an optimization apparatus 200 according to the second example embodiment. The optimization apparatus 200 is an information processing apparatus which is a specific example of the optimization apparatus 100 described above. The optimization apparatus 200 includes a storage unit 210, a memory 220, an interface (IF) unit 230, and a control unit 240.

The storage unit 210 is a storage device such as a hard disk or a flash memory. The storage unit 210 stores an exploration parameter 211 and an optimization program 212. The exploration parameter 211 is a parameter used when determining a policy for each round, which will be described later. As the exploration parameter 211, a parameter group calculated for each round may be input from outside and stored. Alternatively, the exploration parameter 211 may be calculated for each round in the optimization apparatus 200. The optimization program 212 is a computer program in which the optimization method according to the present example embodiment is implemented.

The memory 220 is a volatile storage device such as a random access memory (RAM), and is a storage area for temporarily holding information during an operation of the control unit 240. The IF unit 230 is an interface for inputting and outputting data to and from the outside of the optimization apparatus 200. For example, the IF unit 230 receives input data from another computer or the like via a network (not illustrated), and outputs the received input data to the control unit 240. The IF unit 230 outputs data to a destination computer via a network in response to an instruction from the control unit 240. Alternatively, the IF unit 230 receives a user operation via an input device (not illustrated) such as a keyboard, a mouse, or a touch panel, and outputs the received operation content to the control unit 240. In addition, the IF unit 230 performs the output to a touch panel, a display device, a printer, or the like (not illustrated), in response to an instruction from the control unit 240.

The control unit 240 is a processor such as a central processing unit (CPU), and controls each configuration of the optimization apparatus 200. The control unit 240 reads the optimization program 212 from the storage unit 210 into the memory 220, and executes the optimization program 212. As a result, the control unit 240 achieves functions of the setting unit 241, the policy determination unit 242, the policy execution unit 243, the update rate determination unit 244, and the update unit 245. Each of the setting unit 241, the policy determination unit 242, the policy execution unit 243, the update rate determination unit 244, and the update unit 245 is an example of the setting unit 110, the policy determination unit 120, the policy execution unit 130, the update rate determination unit 140, and the update unit 150 which have been described above.

The setting unit 241 performs initial setting of a predetermined non-linear objective function. In addition, the setting unit 241 receives input of the exploration parameter 211 or a calculation formula of the exploration parameter 211 from the outside as necessary, and stores the received data in the storage unit 210.

The policy determination unit 242 determines a policy to be executed in the online optimization in the bandit problem, based on the nonlinear objective function. Herein, the policy determination unit 242 determines a policy by further using the exploration parameter 211. Furthermore, the policy determination unit 242 may calculate (update, select) the exploration parameter 211, based on the number of trials of updating in the non-linear objective function, and may determine the policy by further using the calculated exploration parameter 211. Further, the policy determination unit 242 may calculate the exploration parameter 211, based on a distance from a boundary of a feasible region. For example, the policy determination unit 242 calculates the exploration parameter 211 by using the above input calculation formula for each round. Alternatively, the policy determination unit 242 may use the exploration parameter 211 calculated outside in advance in accordance with the number of rounds. In addition, the policy determination unit 242 calculates a mean value and a covariance matrix of a plurality of samples generated based on the estimated value of the non-linear objective function, and determines a policy by further using the mean value and the covariance matrix.

The policy execution unit 243 executes the policy determined by the policy determination unit 242 as an input of a non-linear objective function, and acquires a reward as an execution result (value of the objective function).

The update rate determination unit 244 determines an update rate of the non-linear objective function by the multiplicative weight update method, based on the reward acquired by the policy execution unit 243 and the non-linear objective function.

The update unit 245 updates the non-linear objective function, based on the update rate determined by the update rate determination unit 244.

<Flow of Optimization Method>

Figure 4:
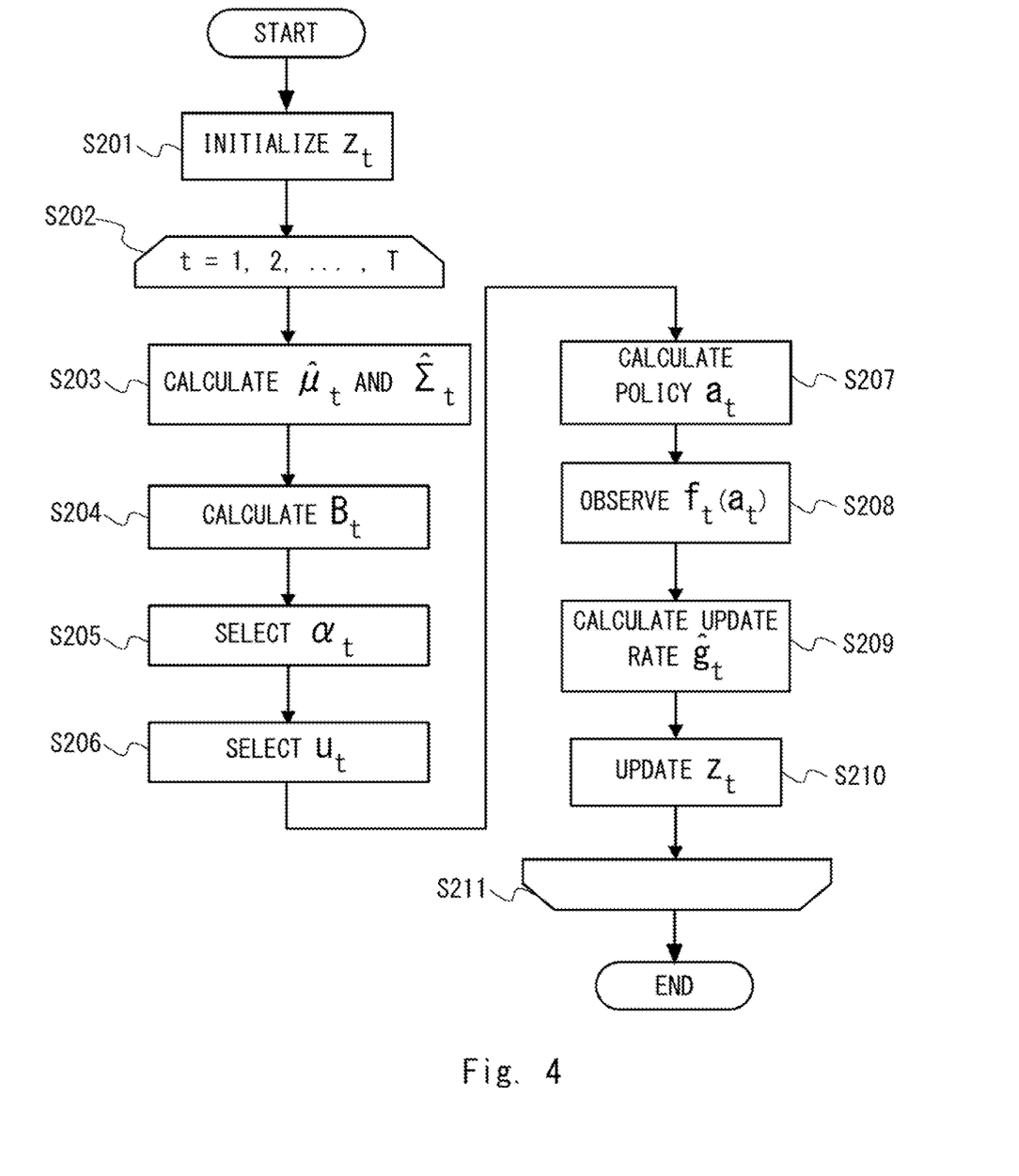
FIG. 4 is a flowchart illustrating a flow of an optimization method according to the second example embodiment.

FIG. 4 is a flowchart illustrating a flow of the optimization method according to the second example embodiment. First, as a precondition, an upper limit value $T \in N$ of rounds (the number of repetition times), a membership oracle MO for a learning rate $\eta > 0$, and a strong-convexity parameter $\sigma > 0$ are assumed. It is also assumed that an exploration parameter $\alpha_t$ satisfies the following:

$$\{\alpha_t\}_{t=1}^T \subseteq \mathbb{R}_{>0}. \quad \text{[Math. 19]}$$

In addition, the optimization apparatus 200 holds a function $z_t$ on K', based on a multiplicative weights update method according to Non Patent Literature 6 in the memory 220.

First, the setting unit 241 initializes $z_t$ of (an estimated value of) the non-linear objective function as described below (S201).

$$z_1(x) = \sigma \frac{\|x\|_2^2}{2}, \quad \text{[Math. 20]}$$

where $p_t$ is a probability distribution on K' using a density proportional to $\exp(-\eta z_t(x))$ for each round. In other words, $Z_t$ and $p_t$ are defined by the following expression (7):

[Math. 21]

$$Z_t := \int_{x \in K'} \exp(-\eta z_t(x)) dz, \quad p_t(x) = \frac{\exp(-\eta z_t(x))}{Z_t}. \quad (7)$$

Next, the control unit 240 increments t by one from round t=1 to T, and repeats the following steps S203 to S210 (S202).

First, the policy determination unit 242 generates an $x_t^{(M)}$ from a sample $x_t^{(1)}$ by $p_t$. Herein, M is the number of samples generated and M≥1. Note that a method of generating samples from lot will be described later. Next, the policy determination unit 242 calculates the mean estimated value $\hat{\mu}_t$ and an estimated value $\hat{\Sigma}_t$ of the covariance matrix by the following equation (9) from the generated sample $x_t^{(1)}$ to the $x_t^{(M)}$ in such a way as to satisfy the following expression (8) (S203). Note that $\mu_t$ and $\Sigma_t$ represent a mean and a covariance matrix for $p_t$.

[Math. 22]

$$\|\hat{\mu}_t - \mu_t\|_{\hat{\Sigma}_t^{-1}} \le 1/9, \quad \|\hat{\Sigma}_t - \Sigma_t\|_{\hat{\Sigma}_t^{-1}} \le 1/9, \quad E[\hat{\mu}_t | \mu_t] = \mu_t. \quad (8)$$

[Math. 23]

$$\hat{\mu}_t = \frac{1}{M} \sum_{j=1}^{M} x_t^{(j)}, \quad \hat{\Sigma}_t = \frac{1}{M} \sum_{j=1}^{M} (x_t^{(j)} - \hat{\mu}_t)(x_t^{(j)} - \hat{\mu}_t^{(j)}). \quad (9)$$

Herein, when M is set to be sufficiently large, the expression (8) is maintained with a high probability.

Next, the policy determination unit 242 calculates a matrix $B_t$. Herein, the policy determination unit 242 calculates a matrix $B_t \in \mathbb{R}^{d \times d}$ in such a way as to satisfy the following:

$$B_t^T B_t = \hat{\Sigma}_t. \quad \text{[Math. 24]}$$

For example, the policy determination unit 242 can calculate the matrix $B_t$ by Cholesky decomposition algorithms.

The policy determination unit 242 selects the exploration parameter at (S205). A method of selecting the exploration parameter $\alpha_t$ will be described later.

Then, the policy determination unit 242 smooths a function $f_t$ by using $B = \alpha_t B_t$ in the above equation (4), and calculates an expected value $\hat{f}_t$ of the function by the following expression (10):

$$\hat{f}_t(x) := E[f_t(x + \alpha_t B_t v)] \quad \text{[Math. 25] ... (10)}.$$

Herein, v is uniformly distributed on $B^d = \{v \in \mathbb{R}^d \mid \|v\|_2 \le 1\}$ as described above.

Then, the policy determination unit 242 randomly and uniformly selects $u_t$ from a unit sphere $S^d = \{u \in \mathbb{R}^d \mid \|u\|_2 = 1\}$ (S206). Then, the policy determination unit 242 calculates (determines) a policy $a_t$ by $a_t = \mu_t + \alpha_t B_t u_t$ by using a mean $\mu_t$, the exploration parameter $\alpha_t$, the matrix $B_t$ and the selected $u_t$ (S207).

Then, the policy execution unit 243 executes the determined policy at and acquires the execution result, specifically, the policy execution unit 243 inputs the policy $a_t$ to a function $f_t(x)$, and observes the value $f_t(a_t)$ of the function to be outputted (S208).

Based on this observation, the update rate determination unit 244 calculates an update rate $\hat{g}_t \in \mathbb{R}^d$ by the following equation (11) (S209):

$$\hat{g}_t = d \cdot f_t(a_t)(\alpha_t B_t)^{-1} u_t \quad \text{[Math. 26] ... (11)}.$$

This is a random estimated value of a gradient $\nabla \hat{f}_t(\hat{\mu}_t)$. In other words, since $\hat{\mu}_t$ and $B_t$ are given, a conditional expected value of $\hat{g}_t$ satisfies the following equation (12):

$$E[\hat{g}_t] = E[d \cdot f_t(\hat{\mu}_t + \alpha_t B_t u_t)(\alpha_t B_t)^{-1} u_t] = \nabla \hat{f}_t(\hat{\mu}_t) \quad \text{[Math. 27] ... (12)},$$

where a second inequality is acquired from the above equation (5).

The update unit 245 updates $z_t$ by using the random estimated value $\hat{g}_t$ as illustrated in the following equation (13) (S210):

[Math. 28]

$$z_{t+1}(x) = z_t(x) + \hat{g}_t^T(x - \hat{\mu}_t) + \frac{\sigma}{2}\|x - \hat{\mu}_t\|_2^2. \quad (13)$$

Thereafter, the control unit 240 determines whether the round t=T (S211), and when t is less than T, the control unit 240 returns to the step S202, performs t=t+1, and executes the step S203 and subsequent steps. In the step S211, when t is T, the present optimization processing ends.

<Examples of Method of Generating Samples from $p_t$s>

A simple example of a method of generating samples from $p_t$ is to use a normal distribution. Herein, since $p_t$ is defined by the above $z_1(x)$, expression (7), and equation (13), the distribution $p_t$ is a multi-dimensional cut normal distribution on K expressed as follows:

$$p_t(x) \propto \exp\left(-\frac{\sigma \eta t \|x - \theta_t\|_2^2}{2}\right) (x \in K'), \quad \text{[Math. 29]}$$

$$p_t(x) = 0 \; (x \in \mathbb{R}^d \setminus K'), \text{ where}$$

$$\theta_t = \frac{1}{t} \sum_{j=1}^{t-1} \left(\hat{\mu}_j - \frac{1}{\sigma}\hat{g}_j\right). \quad \text{[Math. 30]}$$

Therefore, by sampling x from a normal distribution $$N\left(\theta_t, \frac{1}{\sigma \eta t}I\right) \quad \text{[Math. 31]}$$

to $x \in K'$, x can be acquired following pt.

However, although the above processing is sufficiently practical in many cases, it does not necessarily end in polynomial time. In such a case, since pt is a log-concave distribution, a polynomial temporal sampling method based on MCMC (Non Patent Literature 4) can be applied instead of the above processing. At this time, the membership oracle may be called. Note that as for a more efficient method of computing $\hat{\mu}$ and $\hat{\Sigma}$ and sampling from $p_t$ the technique of Non Patent Literature 7 can be used.

<Example of Method of Selecting Exploration Parameter $\alpha_t$>

In the step S205 described above, the policy determination unit 242 needs to select $\alpha_t$ in such a way that $a_t=\hat{\mu}_t+\alpha_t B_t u_t$ is an executable solution, i.e., $a_t \in K$. The following proposal provides sufficient conditions for this, <Proposal>

When $\alpha_t$ is bounded by $$0 < \alpha_t \le \frac{1}{9} + r\sqrt{\frac{\eta\sigma}{2}}, \quad \text{[Math. 32]}$$

$a_t = \hat{\mu}_t + \alpha_t B_t u_t$ is within K.

<Proof>

$\alpha_{t1}$ and $\alpha_{t2}$ is assumed to be $$\alpha_{t1} \le 1/9, \quad \alpha_{t2} \le r\sqrt{\eta\sigma/2} \quad \text{[Math. 33]}$$

and a positive number such as $\alpha_t = \alpha_{t1} + \alpha_{t2}$. $a_t$ is expressed as $a_t = \hat{\mu}_t + \alpha_{t1} B_t u_t + \alpha_{t2} B_t u_t$, and since all points of K' are r-interiors of K, it suffices to indicate (i) $\hat{\mu}_t + \alpha_{t1} B_t u_t \in K'$ and (ii) $\|\alpha_{t2} B_t u_t\|_2 \le r$.

From Auxiliary Theorem 3, $$\|\hat{\mu}_t + \alpha_{t1} B_t u_t - \mu_t\|_{93_t^{-1}} \le 1/e \quad \text{[Math. 34]}$$

implies $\hat{\mu}_t + \alpha_{t1} B_t u_t \in K'$. From the triangular inequality, expression (14) is provided.

[Math. 35]

$$\|\hat{\mu}_t + \alpha_{t1} B_t u_t - \mu_t\|_{\Sigma_t^{-1}} \le \|\hat{\mu}_t - \mu_t\|_{\Sigma_t^{-1}} + \alpha_{t1} \|B_t u_t\|_{\Sigma_t^{-1}} \le \frac{1}{9} + \frac{1}{9}\|\Sigma_t^{-1/2} B_t u_t\|_2 \le \frac{1}{9}(1 + \|\Sigma_t^{-1/2} B_t\|_2) \quad (14)$$

From the expression (8), $$\|\Sigma_t^{-1/2} B_t\|_2 \le 2 \quad \text{[Math. 36]}$$

is led. By combining this with the expression (14), the following implications for holding (i) is acquired:

$$\|\hat{\mu}_t + \alpha_t 1 B_t u_t - \mu_t\|_{\Sigma_t^{-1}} \le 1/3 \le 1/e \quad \text{[Math. 37]}$$

Herein, since $\eta z_t(x)$ is a $(\eta\sigma)$-strongly convex function, a covariance matrix $\Sigma t = \text{Cov}(pt)$ $$\|\Sigma_t\|_2 \le 1/(\eta\sigma) \quad \text{[Math. 38]}$$

is defined as the boundary from the Auxiliary Theorem 2. From this and the expression (8), $$\|\hat{\Sigma}_t\|_2 \le 2/(\eta\sigma) \quad \text{[Math. 39]}$$

is acquired. Therefore, the following expression (15) is acquired:

$$\|B_t\|_2 \le \sqrt{\|\hat{\Sigma}_t\|_2} \le \sqrt{2/(\eta\sigma)} \quad \text{[Math. 40]} \ldots (15).$$

From the expression (15) and $$\|u_t\| = 1, \text{ and } \alpha_t \le r\sqrt{\eta\sigma/2}, \quad \text{[Math. 41]}$$

(ii) is denoted.

Based on the above, it is desirable that the exploration parameter $\alpha_t$ is selected by the following equation (16). The equation (16) is an example of calculation formulas of the exploration parameter $\alpha_t$ described above:

[Math. 42]

$$\alpha_t = \min\left\{\frac{1}{9} + r\sqrt{\frac{\eta\sigma}{2}}, \sqrt{d}\right\}. \quad (16)$$

Namely, the exploration parameter at is calculated based on the round t. For example, in the step S205, the policy determination unit 242 may calculate the exploration parameter $\alpha_t$ by applying the current round t to the equation (16). Alternatively, when the exploration parameter $\alpha_t$ for each round t is calculated in advance outside the optimization apparatus 200 and already acquired as the exploration parameter 211, the policy determination unit 242 may select and read out the exploration parameter $\alpha_t$ associated to the round t at that time from the exploration parameters 211 in the storage unit 210.

Further, r is less than the shortest distance from a boundary of the feasible region K. In other words, it indicates that a circle having a radius r centered on the exploration parameter $\alpha_t$ exists in the feasible region K. Also, r can be referred to as an index indicating how far the optimal solution of $\alpha$ exists inside the feasible region K. In addition, it can be said that the policy determination unit 242 applies the rounds t and r at that time to the equation (16) and calculates the exploration parameter at in the step S205.

<Effect>

The Regret Limit in the above-mentioned Non Patent Literature 1 is $$\tilde{O}(d^{2/3} T^{2/3}), \quad \text{[Math. 43]}$$

but a Regret Limit in this disclosure is $$\tilde{O}(d\sqrt{T}). \quad \text{[Math. 44]}$$

Non Patent Literature 3 has failed to efficiently construct self-concordant barriers for general convex sets. With a v-self-concordant barrier, the Regret Limit implies that there is a gap of $$\sqrt{v} \quad \text{[Math. 45]}$$

between the upper and lower limits, and therefore, $$\tilde{O}(d\sqrt{vT}). \quad \text{[Math. 46]}$$

Because v is generally at least d for any compression convex set K, from the lower limit of $$O(d\sqrt{T}), \quad \text{[Math. 47]}$$

there is a gap of $$\Omega(\sqrt{d}). \quad \text{[Math. 48]}$$

Also, this is because, when there is a self-concordant barrier with a small v, for example, when K is expressed by m(>>d) linear inequality, the gap is even worse.

In contrast, the present disclosure can overcome the above-mentioned problems.

(i) Under mild assumptions, the algorithm of the present disclosure is a minimax optimal factor up to a logarithm.

$$\tilde{O}(d\sqrt{T}) \quad \text{[Math. 49]}$$

Regret is accomplished. The result is a first rigid boundary for the bandit convex optimization that applies to the constraint problem. Given the assumption that more accurately, optimal solutions exist in r-interiors, the algorithms of the present disclosure acquire a Regret Limit of $$\tilde{O}(d\sqrt{T}+d^2/r^2). \quad \text{[Math. 50]}$$

Moreover, even in a case of the absence of interior assumptions, the algorithm has a Regret Limit of $$\tilde{O}(d^{3/2}\sqrt{T}),$$ [Math. 51]

which is at least better than known algorithms.

(ii) The algorithm of the present disclosure does not require a self-concordant barrier. In fact, it is assumed that it has access to the membership oracle for a feasible region. This means that even if K is expressed by an exponentially large number of linear inequalities, or is a record given a known obvious form of K, the algorithm of the present disclosure works well.

In addition, efficient algorithms for sampling from logarithmic concave distributions can be executed in polynomial time.

Other Example Embodiments

In the above example embodiment, the hardware configuration has been described, but the present invention is not limited thereto. The present disclosure is also able to achieve any processing by causing a central processing unit (CPU) to execute a computer program.

In the above examples, programs may be stored and provided to a computer by using various types of non-transitory computer readable media. Non-transitory computer readable media include various types of tangible storage media. Examples of the non-transitory computer readable media include a magnetic recording medium (e.g., a flexible disk, a magnetic tape, a hard disk drive), a magneto-optical recording medium (e.g., a magneto-optical disk), a read only memory (CD-ROM), a CD-R, a CD-R/W, a digital versatile disc (DVD), and a semiconductor memory (e.g., a mask ROM, a programmable ROM (PROM), an erasable PROM (EPROM), a flash ROM, a random access memory (RAM)). The program may also be supplied to the computer by various types of transitory computer readable media. Examples of the transitory computer-readable media include electrical signals, optical signals, and electromagnetic waves. The transitory computer readable medium may provide the program to the computer via wired communication paths, such as an electrical wire and an optical fiber, or a wireless communication path.

Note that the present disclosure is not limited to the above-mentioned example embodiments, and can be modified as appropriate within a range not deviating from the gist. The present disclosure may be implemented by appropriately combining respective example embodiments.

A part or all of the above example embodiments may also be described as the following supplementary notes, but are not limited to the following.

(Supplementary Note A1)
An optimization apparatus including:
a setting unit that sets a predetermined non-linear objective function;
a policy determination unit that determines a policy to be executed in online optimization in a bandit problem, based on the non-linear objective function;
a policy execution unit that acquires a reward as an execution result of the determined policy;
an update rate determination unit that determines an update rate of the non-linear objective function by a multiplicative weight update method, based on the acquired reward and the non-linear objective function; and
an update unit that updates the non-linear objective function, based on the update rate.

(Supplementary Note A2)
The optimization apparatus according to supplementary note A1, wherein the policy determination unit determines the policy by further using a predetermined exploration parameter.

(Supplementary Note A3)
The optimization apparatus according to supplementary note A1, wherein the policy determination unit
calculates the exploration parameter, based on the number of trials of updating in the non-linear objective function, and
determines the policy by further using the calculated exploration parameter.

(Supplementary Note A4)
The optimization apparatus according to supplementary note A3, wherein the policy determination unit
further calculates the exploration parameter, based on a distance from a boundary of a feasible region.

(Supplementary Note A5)
The optimization apparatus according to any one of supplementary notes A1 to A4, wherein the policy determination unit
calculates a mean value and a covariance matrix of a plurality of samples that are generated based on an estimated value of the non-linear objective function, and
determines the policy by further using the mean value and the covariance matrix.

(Supplementary Note B1)
An optimization method including,
setting a predetermined non-linear objective function;
determining a policy to be executed in online optimization in a bandit problem, based on the non-linear objective function;
acquiring a reward as an execution result of the determined policy;
determining an update rate of the non-linear objective function by a multiplicative weight update method, based on the acquired reward and the nonlinear objective function; and
updating the non-linear objective function, based on the update rate.

(Supplementary Note C1)
A non-transitory computer readable medium having stored therein an optimization program for causing a computer to execute:
setting processing of setting a predetermined non-linear objective function;
policy determination processing of determining a policy to be executed in online optimization in a bandit problem, based on the non-linear objective function;
policy execution processing of acquiring a reward as an execution result of the determined policy;
update rate determination processing of determining an update rate of the non-linear objective function by a multiplicative weight update method, based on the acquired reward and the non-linear objective function; and
update processing of updating the non-linear objective function, based on the update rate.

The present invention has been described above with reference to example embodiments (and examples), but the present invention is not limited to the above example embodiments (and examples). Various modifications can be made to the structure and details of the present invention which can be understood by a person skilled in the art within the scope of the present invention.

REFERENCE SIGNS LIST

100 Optimization apparatus
110 Setting unit
120 Policy determination unit
130 Policy execution unit
140 Update rate determination unit
150 Update unit
200 Optimization apparatus
210 Storage unit
211 Exploration parameter
212 Optimization program
220 Memory
230 IF unit
240 Control unit
241 Setting unit
242 Policy determination unit
243 Policy execution unit
244 Update rate determination unit
245 Update unit

What is claimed is:

1. An optimization apparatus comprising:
at least one memory configured to store instructions; and
at least one processor configured to execute the instructions to:
set a predetermined non-linear objective function;
repeat a plurality of times:
determine a policy to be executed in online optimization in a bandit problem in which values thereof of the predetermined non-linear objective function are only partially acquired, based on the predetermined non-linear objective function;
execute the determined policy;
acquire a reward, as an execution result of the determined policy;
determine an update rate of the predetermined non-linear objective function by a multiplicative weight update method, based on the acquired reward and the predetermined non-linear objective function; and
update the predetermined non-linear objective function, based on the update rate, such that the predetermined non-linear objective function as updated is used a next time the policy is determined,
wherein updating of the predetermined non-linear objective function each of the plurality of times achieves high precision online optimization of the determined policy that is executed.

2. The optimization apparatus according to claim 1, wherein the at least one processor is further configured to execute the instructions to: determine the policy by further using an exploration parameter.

3. The optimization apparatus according to claim 2, wherein the at least one processor is further configured to execute the instructions to:
calculate the exploration parameter, based on a number of the plurality of times, and
determine the policy by further using the calculated exploration parameter.

4. The optimization apparatus according to claim 3, wherein the at least one processor is further configured to execute the instructions to: further calculate the exploration parameter, based on a distance from a boundary of a feasible region.

5. The optimization apparatus according to claim 1, wherein the at least one processor is further configured to execute the instructions to: calculate a mean value and a covariance matrix of a plurality of samples that are generated based on an estimated value of the non-linear objective function, and determine the policy by further using the mean value and the covariance matrix.

6. An optimization method comprising, by a computer:
setting a predetermined non-linear objective function;
repeating a plurality of times:
determining a policy to be executed in online optimization in a bandit problem in which values thereof of the predetermined non-linear objective function are only partially acquired, based on the predetermined non-linear objective function;
executing the determined policy;
acquiring a reward, as an execution result of the determined policy;
determining an update rate of the predetermined non-linear objective function by a multiplicative weight update method, based on the acquired reward and the predetermined non-linear objective function; and
updating the predetermined non-linear objective function, based on the update rate, such that the predetermined non-linear objective function as updated is used a next time the policy is determined,
wherein updating of the predetermined non-linear objective function each of the plurality of times achieves high precision online optimization of the determined policy that is executed.

7. A non-transitory computer-readable medium storing an optimization program executable by a computer to perform:
setting a predetermined non-linear objective function;
repeating a plurality of times:
determining a policy to be executed in online optimization in a bandit problem in which values thereof of the predetermined non-linear objective function are only partially acquired, based on the predetermined non-linear objective function;
executing the determined policy;
acquiring a reward, as an execution result of the determined policy;
determining an update rate of the predetermined non-linear objective function by a multiplicative weight update method, based on the acquired reward and the predetermined non-linear objective function; and
updating the predetermined non-linear objective function, based on the update rate, such that the predetermined non-linear objective function as updated is used a next time the policy is determined,
wherein updating of the predetermined non-linear objective function each of the plurality of times achieves high precision online optimization of the determined policy that is executed.

* * * * *